UNITED STATES PATENT OFFICE.

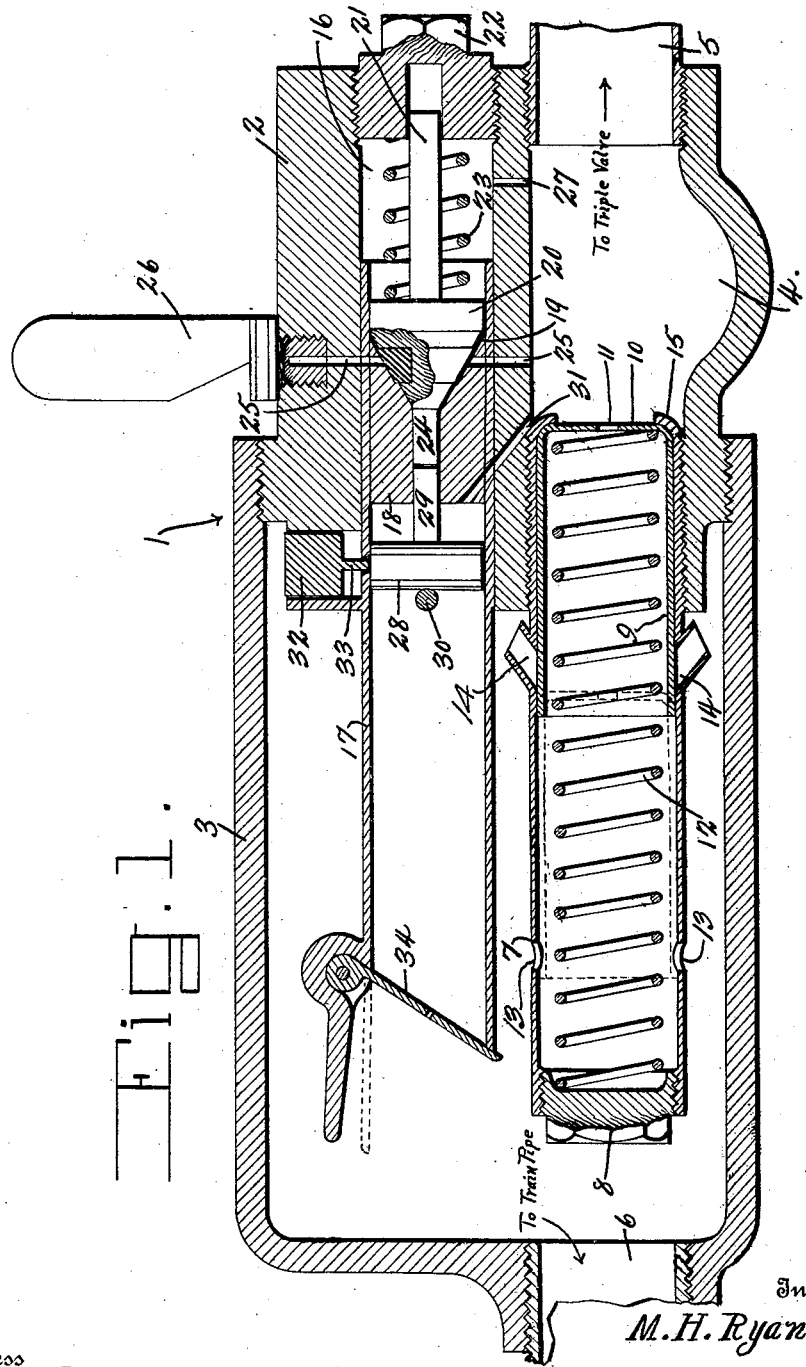

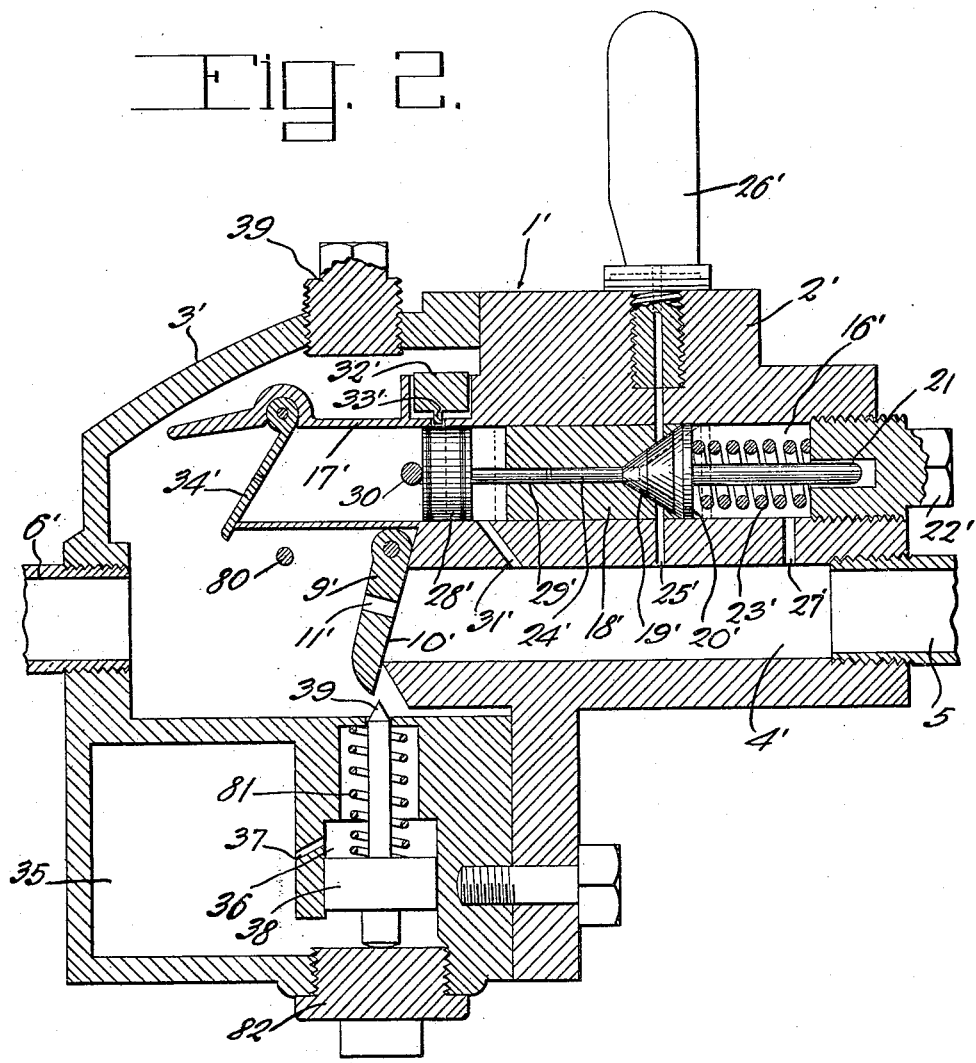

MICHAEL H. RYAN, OF SAN BERNARDINO, CALIFORNIA.

SAFETY-VALVE FOR AIR-BRAKES.

1,275,479.　　　　　Specification of Letters Patent.　　Patented Aug. 13, 1918.

Application filed June 12, 1917.　Serial No. 174,324.

*To all whom it may concern:*

Be it known that I, MICHAEL H. RYAN, a citizen of the United States, residing at San Bernardino, in the county of San Bernardino and State of California, have invented new and useful Safety-Valves for Air-Brakes, of which the following is a specification.

The present invention relates to a valve structure adapted for use between the triple valve and train pipe of an air brake equipment, and is an improvement over the safety valve for air brakes disclosed in my Patent No. 1,229,325, granted June 12, 1917.

The invention has for its object to provide an improved valve structure operable to permit a restricted flow of air from the train pipe to the brake cylinder in the event of undesired emergency of the triple valve, and to provide an unrestricted flow of air from the train pipe to the brake cylinder in the event of a desired emergency.

It is the object of the invention to provide an improved safety valve of the nature disclosed in said application and having the same general functions, with added features, to enhance the utility and efficiency of the device, the device avoiding the application of the brakes of the other cars, should the triple valve of one car spring a leak or assume an undesired emergency position, but permitting of the regular service and desired emergency application of the brakes.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a longitudinal median section of one form of the device, portions being shown in elevation.

Fig. 2 is a similar view of a modified form generally resembling the valve structure disclosed in the copending application, but having improved features.

Referring specifically to Fig. 1, the device disclosed therein is of the sliding valve type, and embodies a casing 1 comprising the block or body 2 and the cup or section 3 having its open end threaded upon the body 2. The body 2 is provided with an expansion chamber 4 communicating with the pipe 5 threadedly or otherwise attached to the body 2 and leading to the triple valve of the brake equipment of the car, while a pipe 6 attached to the closed end of the cap 3 extends to the train pipe.

In order to provide a check valve for restricting the flow of air from the pipe 6 to the pipe 5 and triple valve in the event of undesired emergency application and for permitting the unrestricted flow of air in the opposite direction from the triple valve to the train pipe (then reversing—passing to the brake cylinder in the event of desired emergency application by way of ports 14 hereinafter described), there is provided a tubular guide member 7 having one end threadedly or otherwise engaged within the body 2 in communication with the expansion chamber 4, and said tubular member 7 extends to the cap 3 to be housed therein, the other end of the member 7 being closed by a screw plug 8. A cup-shaped sliding valve 9 is slidable within the tubular member 7 with its open end away from the expansion chamber 4 and extending toward the plug 8, while the closed end 10 of the valve has a restricted aperture 11. A coiled wire expansion spring 12 is disposed within the member 7 and the valve 9 and is confined between the end wall 10 of the valve and the plug 8 whereby to move the valve 9 to closed position toward the expansion chamber 4, as seen in Fig. 1. The member 7 is provided with one or more ports 13 therein near its closed end, and with one or more ports 14 near its open end, the latter being normally closed by the valve 9 when it is in normal position. The open end of the member 7 has stops 15 to limit the movement of the valve 9 under the tension of the spring 12.

If an audible signal is desired, although it need not be used, the body 2 is provided as shown with a bore 16 extending therethrough parallel with the pipe 5 and member 7, and a tubular member 17 can be fitted in said bore and extends into the cap 3. A plug 18 is fitted within the member 17 and has a conical valve seat 19 in which a conical valve 20 is seatable, said valve having a stem 21 extending slidably into a plug 22 closing the outer end of the bore 16, a coiled wire expansion spring 23 being confined between the valve 20 and plug 22 for normally seating said valve. The valve 20 also has a stem 24 extending slidably into the plug 18, and the body 2, member 17 and plug 18 have an air passage 25 intersecting the valve seat and extending from the expansion chamber 4 to a whistle 26 or other audible signal connected to the body 2, said passage being normally closed by the valve. A passage 27 in the body 2 establishes communication between the outer end portion of the bore 16 and expansion chamber 4, and a piston 28 is slidable within the tubular member 17 which provides a cylinder for the piston, said piston having a stem 29 extending into the plug 18 to abut against the stem 24. A stop 30 is provided in the member 17 for limiting the movement of the piston 28 away from the valve 20, and the body 2. The member 17 and the plug 18 are provided with a passage 31 establishing communication between the expansion chamber 4 and the interior of the member 17 at one side of the piston 28 opposite to that end of the member 17 which opens into the chamber within the cap 3. A catch 32 is slidable above the member 17 and piston 28 and has a depending finger 33 slidable through the upper portion of said member to drop in front of the piston 28 when it is forced rearwardly toward the plug 18, whereby to hold the piston in position adjacent to said plug. It is preferable to provide a flat check valve 34 for the free end of the member 17, said valve having a restricted aperture to permit the restricted flow of air through the member 17, and the unrestricted flow of air out of said member 17.

The operation of the check valve 9 is as follows: The compressed air can flow in a restricted stream from the train pipe to the triple valve to ordinarily hold the brakes inoperative, by way of the pipe 6, chamber or cap 3, ports 13, member 7, restricted aperture 11 which restricts the flow of air, expansion chamber 4 and pipe 5. Should the triple valve leak or assume an undesired emergency position, this will avoid the excessive reduction in pressure in the train pipe, as would apply the brakes in all of the other cars, since only a restricted flow of air from the train pipe to the triple valve is possible past the valve 9 which closes in the direction of the triple valve. In the event of the desired emergency application of the brakes, however, the air can flow unrestrictedly from the triple valve to the train pipe, since the valve 9 will be carried toward the plug 8 by the flow of air from the expansion chamber 4 into the member 7, the pressure of air against the valve 9 being greater at the expansion chamber side than at the opposite side, so that the valve 9 will move to the dotted line position illustrated in Fig. 1, thereby uncovering the ports 14 and permitting the air to flow freely from the expansion chamber 4 and thence to the train pipe. The ports 13, during the movement of the valve 9 against the spring 12 will be closed and prevent the accumulation of pressure behind the valve, so that the valve will be forced open, that is, to uncover the ports 14. The air reverses in the event of desired emergency and holds valve 9 in chamber or member 7 against spring 12 until the necessary train line reduction is made to carry the desired emergency to the next triple valve in either direction. When the flow of air is stopped to equalize the pressure at opposite sides of the valve 9, the spring 12 will close said valve, either when the brakes are applied or released.

The operation of the signal device is as follows: Ordinarily, the pressure against the opposite sides of the piston 28 is equalized since the pressure at opposite sides of the valve 9 is equalized. Air from the cap 3 and pipe 6 flows through the aperture of the valve 34, while air from the expansion chamber 4 flows through the passage 31 against the opposite side of the piston, whereby the spring 23 can seat the valve 20 and close the passage 25, the passage 27 permitting the air to flow into and out of the bore 16 so as to relieve the valve 20 of the pressure. When the triple valve assumes an undesired emergency position or if there is a leak at the triple valve, allowing the air to flow to the triple valve from the expansion chamber 4, the pressure in the expansion chamber will be less than in the cap or chamber 3, whereby the pressure which extends through the passage 31 will be less than the pressure which extends through the aperture of the valve 34, so that the piston 28 will be moved toward the valve 20, and its stem 29 in abutting the stem 24 will force the valve 20 open. The air will then flow through the passage 25 to the whistle 26, to provide the desired audible signal, whereby the defective triple valve can be located and the defect remedied. When the piston 28 is moved to open the valve 20, the catch 32 drops and holds the piston 28. The piston 28 will not be moved toward the valve 20, however, during normal conditions, since the aperture of the valve 34 restricts the flow of air into the member 17, and when there is but a normal flow of air from the train pipe to the triple valve, the difference in pressure in the member 17 will not be sufficient to move the piston 28. Said piston will therefore only be moved when there is an undesired emergency position of the triple valve allowing the air to escape from the expansion chamber 4, to cause the abnormal reduction in pressure therein, as will so reduce the pressure that the corresponding side of the piston 28 to move said piston for opening the valve.

The form of the valve structure shown in Fig. 2 generally resembles the safety valve disclosed in my patent referred to, the casing 1' embodying the body or block 2' and cap or section 3' bolted or otherwise attached thereto. The body 2' has a bore 4' with which the pipe 5' communicates and extends to the triple valve, and the pipe 6' which communicates with the train pipe is attached to the cap 3' to communicate with the chamber thereof. The body 2' has the valve seat 10' at the inner end of the bore 4' against which a pivoted valve 9' seats by gravity, said check valve having a restricted aperture 11' permitting of the restricted flow of air to the triple valve. Said valve can swing open toward the train pipe to permit of the unrestricted flow of air from the triple valve during the desired emergency or service application of the brakes. The body 2' has the bore 16' in which a plug 18' is fitted, said plug having the valve seat 19' for the valve 20' which has the stem 21' working in the plug 22' and the stem 24' working in the plug 18'. A spring 23' is disposed between the valve 20' and plug 22' for seating the valve, and the body 2' and plug 18' have the passage 25' extending from the bore 4' to the whistle 26'. This passage is normally closed by the valve 20', and the body 2' has the passage 27' between the bores 16' and 4' to allow the valve 20' to move properly. A piston 28' works within the bore 16' and has a stem 29' working within the plug 18' to abut the stem 24' for opening the valve by the reduction of pressure in the bore 4' and pipe 5' due to an undesired emergency position of the triple valve. A passage 31' in the body 2' establishes communication with the bore 4' and the bore 16' in rear of the piston 28', whereby said piston will move rearwardly when the pressure is reduced abnormally in the bore or expansion chamber 4'. A catch 32' is slidable vertically within the body 2' above the piston and has a finger 33' to drop in front of the piston when it is moved, and the cap 3' is preferably provided with a removable plug 39 above the catch whereby the catch can be released and access to the interior of the casing had.

The cap or casing section 3' is provided with a chamber 35 and a vertical passage 36 in which a plunger 38 is slidable vertically. The partition between the chamber 35 and main chamber of the cap 3' has a restricted port or aperture 37 normally uncovered when the plunger 38 is moved downwardly but adapted to be covered when the plunger is raised. The plunger is provided at its upper end with a cam 39 movable into engagement with the lower free end of the check valve 9'. Thus, when a desired emergency application of the brakes is provided, the air flowing to the train pipe, the reduction in pressure within the cap 3' above the plunger being momentarily less than the pressure accumulated within the chamber 35, will raise the plunger. In other words, the opening of the pipe 6' to the atmosphere by way of the train pipe, will relieve the pressure on the upper end of the plunger 38, but the escape of air from the chamber 35 through the aperture 37 is restricted, so that the pressure against the lower end of the plunger 38 will be greater than against the upper end thereof, causing said plunger to be raised. The plunger in being raised will close the aperture 37, thus preventing the further escape of air from the chamber 35. The air which does escape, however, from the chamber 35 through the aperture 37, will reduce the pressure in the chamber 35 slightly below the normal pressure, but this reduced pressure in the chamber 35 is still greater than the pressure in the cap 3' during the emergency application of the brakes. The cam 39 will therefore force and hold the check valve 9' open. Then when the train pipe is closed and air forced through the pipe 6' into the casing 1', the valve 9' will not seat immediately, and this allows the air to flow to the triple valve without the pressure in the cap or chamber 3' being sufficiently greater than the pressure in the bore or chamber 4' to operate the piston 28'. During the accumulation of pressure, the air can flow freely past the valve 9' to the triple valve, and the plunger 38 will not be moved downwardly until the pressure above the plunger overcomes the pressure in the chamber 35, but in the meantime, the valve 9' is held partially open. Then when the pressure becomes normal, the pressure against the upper end of the plunger 38, assisted by its spring 81, is greater than the pressure against the lower end thereof from the chamber 35, whereby the spring depresses the plunger, and releases the valve 9' which will then seat by gravity, to restore normal conditions, as seen in full lines in Fig. 1. There is a stop 80 to limit the movement of valve 9' and the cap 3' has a removable plug 82 below the plunger 38 to insert and remove it. There is also a tubular member 17' and valve 34' similar to parts 17 and 34 above described.

If it were not for the plunger 38 holding the valve 9' open during a desired emergency, the train line air could not pass freely from the train line to the brake cylinder unrestricted.

Each form is therefore provided with means for preventing the operation of the signal during the flow of air from the train pipe to the triple valve after a desired emergency or service application of the brakes. This means in the device shown in Fig. 1 embodies the valves 9 and 34 and corresponding parts, and the form shown in Fig. 2 embodies the plunger 38, valve 9', and corresponding parts.

Having thus described the invention, what is claimed as new is:—

1. A device of the character described having two chambers, one to communicate with a triple valve and the other to communicate with a train pipe, means for restricting the flow of air from the second mentioned to the first mentioned chamber, permitting of the unrestricted flow of air in the opposite direction and momentarily permitting unrestricted flow in the first mentioned direction after the flow of air in the second mentioned direction, means between said chambers adapted to move by an abnormal reduction in pressure in the first mentioned chamber, a signal controlled by the second mentioned means, and means operable after the flow of air from the first to the second mentioned chamber and during the forcing of air from the second mentioned to the first mentioned chamber for preventing the operation of the second mentioned means.

2. A device of the character described having two chambers, one to communicate with a triple valve and the other to communicate with a train pipe, means for restricting the flow of air from the second mentioned to the first mentioned chamber and permitting of the unrestricted flow of air in the opposite direction, means between said chambers adapted to move by an abnormal reduction in pressure in the first mentioned chamber, a signal controlled by the second mentioned means, and means operable after the flow of air from the first mentioned to the second mentioned chamber and during the forcing of air from the second mentioned to the first mentioned chamber for preventing the undesired pressure against the second mentioned means from the second mentioned chamber.

3. A device of the character described having two chambers, one to communicate with a triple valve and the other to communicate with a train pipe, means for restricting the flow of air from the second mentioned to the first mentioned chamber, permitting of the unrestricted flow of air in the opposite direction and momentarily permitting unrestricted flow in the first mentioned direction after the flow of air in the second mentioned direction, signal controlling means operated by an abnormal reduction in pressure in the first mentioned chamber, and a valve permitting unrestricted flow of air from said controlling means to the first mentioned chamber and restricting the flow from the first mentioned chamber to the controlling means.

In testimony that I claim the foregoing as my own, I have hereto affixed my signature in the presence of two witnesses.

MICHAEL H. RYAN.

Witnesses:
A. H. WOOLLEY,
A. S. METTLER.